(12) United States Patent
Mori

(10) Patent No.: US 11,986,978 B2
(45) Date of Patent: May 21, 2024

(54) SUBSTRATE PROCESSING APPARATUS

(71) Applicant: M-DIA & Co., Ltd., Namerikawa (JP)

(72) Inventor: Hiroyoshi Mori, Namerikawa (JP)

(73) Assignee: M-DIA & CO., LTD., Namerikawa (JP)

( * ) Notice: Subject to any disclaimer, the term of this patent is extended or adjusted under 35 U.S.C. 154(b) by 334 days.

(21) Appl. No.: 17/523,118

(22) Filed: Nov. 10, 2021

(65) Prior Publication Data
US 2022/0063139 A1   Mar. 3, 2022

Related U.S. Application Data

(63) Continuation of application No. PCT/JP2020/045691, filed on Dec. 8, 2020.

(30) Foreign Application Priority Data

Feb. 13, 2020   (JP) ................. 2020-022738

(51) Int. Cl.
*B29B 17/02*   (2006.01)
*B29K 23/00*   (2006.01)
*B29K 705/00*  (2006.01)

(52) U.S. Cl.
CPC ...... *B29B 17/02* (2013.01); *B29B 2017/0203* (2013.01); *B29B 2017/0217* (2013.01); *B29K 2023/12* (2013.01); *B29K 2705/00* (2013.01)

(58) Field of Classification Search
CPC ....... C22B 11/025; C22B 11/046; C22B 7/00; Y02W 30/82; B09B 5/00; B09B 3/00; B29B 17/02; B02C 18/06; B02C 18/16
See application file for complete search history.

(56) References Cited

FOREIGN PATENT DOCUMENTS

| CN | 1814357 A | 8/2006 |
|----|-----------|--------|
| CN | 102201327 A | 9/2011 |
| CN | 207240531 U | 4/2018 |

(Continued)

OTHER PUBLICATIONS

International Search Report dated Feb. 22, 2021, issued in counterpart International Application No. PCT/JP2020/045691 (2 pages).

(Continued)

*Primary Examiner* — Bobby Yeonjin Kim
(74) *Attorney, Agent, or Firm* — WHDA, LLP

(57) ABSTRACT

A substrate processing apparatus for separating an electronic component from a substrate with the electronic component attached to an upper surface includes an upper surface processing device that separates the electronic component from the upper surface of the substrate. The upper surface processing device has an upper surface processing transporter that transports the substrate from an upstream side to a downstream side and an upper surface rotary blade that separates the electronic component from the upper surface of the substrate. The upper surface processing transporter has a sixth belt conveyor on the upstream side and a seventh belt conveyor on the downstream side, the sixth and seventh belt conveyors being located below the upper surface rotary blade and aligned in a transport direction. The upper surface rotary blade has a downstream portion facing a gap between the sixth belt conveyor and the seventh belt conveyor.

11 Claims, 11 Drawing Sheets

(56) References Cited

FOREIGN PATENT DOCUMENTS

| JP | H05-48300 | A | | 2/1993 | | |
|----|-----------|---|---|--------|---|---|
| JP | H09-94546 | A | | 4/1997 | | |
| JP | 10-94781 | A | | 4/1998 | | |
| JP | 2004-202302 | A | | 7/2004 | | |
| JP | 2018-79423 | A | | 5/2018 | | |
| JP | 2018079423 | A | * | 5/2018 | ............... | C22B 7/00 |
| JP | 6554454 | B2 | | 7/2019 | | |
| JP | 2021-126614 | A | | 9/2021 | | |
| KR | 20040071672 | A | | 8/2004 | | |
| KR | 100737812 | B1 | | 7/2007 | | |
| KR | 101441860 | B1 | * | 9/2014 | ............... | C22B 7/00 |
| KR | 101441860 | B1 | | 9/2014 | | |

OTHER PUBLICATIONS

Notice of Reasons for Refusal dated Jul. 14, 2020, issued in counterpart JP Patent Application No. 2020-022738, w/ English translation (8 pages).

Notice of Reasons for Refusal dated Oct. 20, 2020, issued in counterpart JP Patent Application No. 2020-022738, w/English translation (8 pages).

Office Action dated Dec. 29, 2023, issued in counterpart CN Application No. 202080027844.9, with partial English translation. (6 pages).

Extended (Supplementary) European Search Report dated Jan. 22, 2024, issued in counterpart EP Application No. 20919278.0. (10 pages).

* cited by examiner

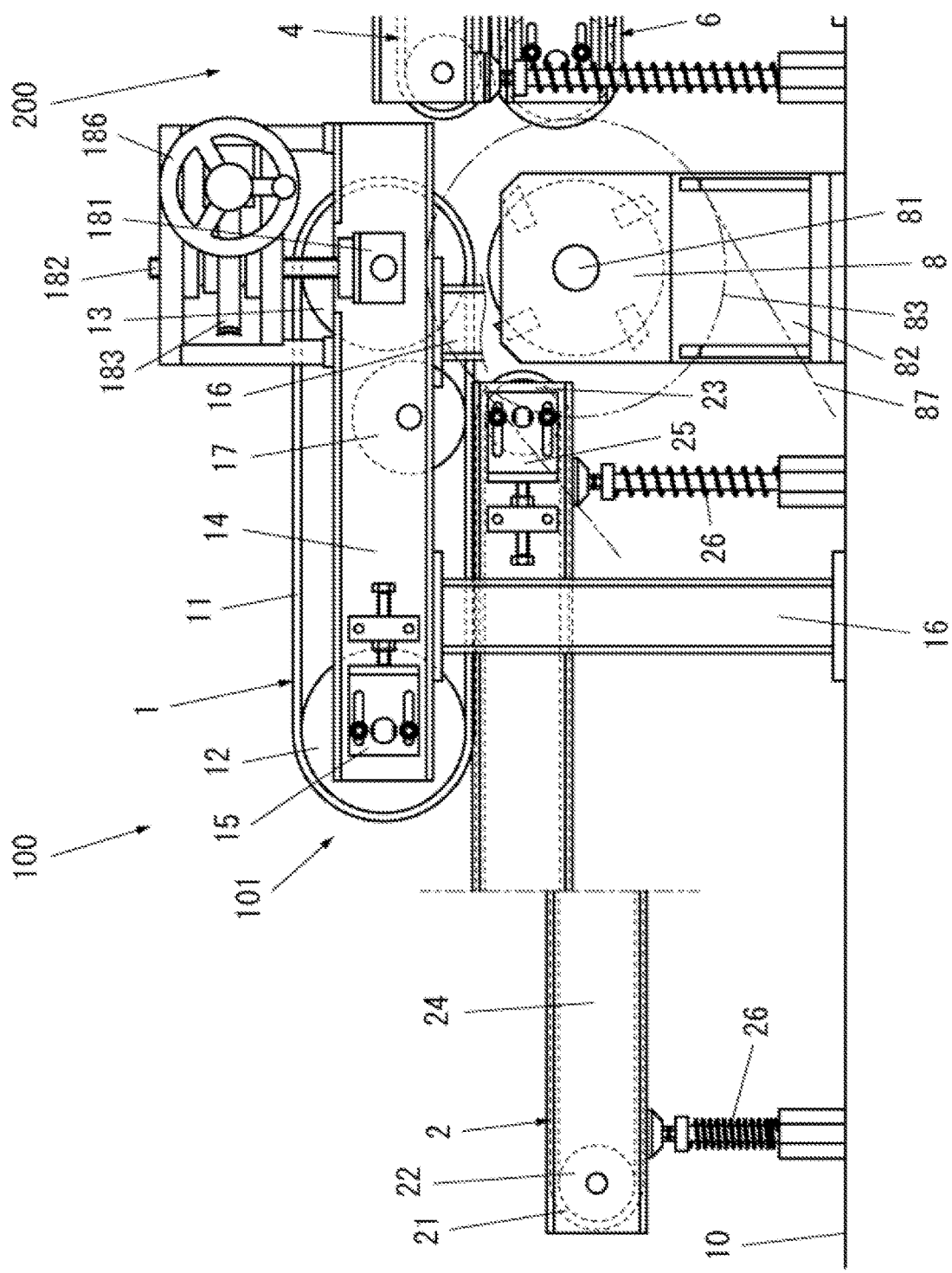

SUBSTRATE PROCESSING APPARATUS

CROSS-REFERENCE OF RELATED APPLICATIONS

This application is a bypass/continuation of International Application No. PCT/JP2020/045691 filed Dec. 8, 2020, which claims priority of Japanese Patent Application No. 2020-022738 filed Feb. 13, 2020, the entire contents of which are incorporated herein by reference.

TECHNICAL FIELD

The present invention relates to a substrate processing apparatus for separating an electronic component from a printed circuit board to which an electronic component such as an IC, a resistor, or a capacitor is attached.

BACKGROUND ART

Printed circuit boards built in personal computers, mobile phones, and the like contain various rare metals, and in recent years, efforts to recover and reuse these metals have been actively made. The rare metals are contained in both the substrate itself and the electronic components on the substrate, and the recovery efficiency can be enhanced by accurately separating the substrate and the components as the initial stage of the recovery work. Conventionally known methods of separation include a method of heating a substrate to melt the solder and a method of melting the substrate with a chemical solution. However, these methods have problems that a large amount of energy is consumed for heating and that it takes time and effort to process a chemical solution. Therefore, in Japanese Patent No. 6554454, the inventor of the present application proposes an apparatus capable of separating a component from a substrate without heat or chemical treatment. This apparatus includes a belt conveyor that transports a substrate while sandwiching the substrate from above and below and a rotary blade that makes contact with the substrate from below, and is designed to separate the component from the lower surface of the substrate in a single operation.

However, conventional apparatuses are unable to separate a component from the upper surface of the substrate. In addition, turning the conventional apparatus upside down would result in the component separated from the substrate being transported by the belt conveyor together with the substrate, which is not convenient for separating the substrate and the component.

SUMMARY OF INVENTION

The present invention provides a substrate processing apparatus capable of separating a component from the upper surface of a substrate without heat or chemical treatment.

The present invention is a substrate processing apparatus for separating an electronic component from a substrate with the electronic component attached to an upper surface, the substrate processing apparatus including an upper surface processing device/unit that separates the electronic component from the upper surface of the substrate. The upper surface processing device has an upper surface processing transporter (transport unit) that transports the substrate from an upstream side to a downstream side and an upper surface rotary blade that separates the electronic component from the upper surface of the substrate. The upper surface processing transporter has a sixth belt conveyor on the upstream side and a seventh belt conveyor on the downstream side, the sixth and seventh belt conveyors being located below the upper surface rotary blade and aligned in a transport direction. The upper surface rotary blade has a downstream portion facing a gap between the sixth belt conveyor and the seventh belt conveyor.

Furthermore, in the present invention, the upper surface processing transporter may have a fourth belt conveyor located above the sixth belt conveyor and transport the substrate while sandwiching the substrate between the fourth belt conveyor on the upper side and the sixth belt conveyor on the lower side, and the upper surface rotary blade may be located downstream of the fourth belt conveyor.

Moreover, in the present invention, the upper surface processing transporter may have a fifth belt conveyor located above the seventh belt conveyor and transport the substrate while sandwiching the substrate between the fifth belt conveyor on the upper side and the seventh belt conveyor on the lower side, and the upper surface rotary blade may be located upstream of the fifth belt conveyor.

Furthermore, in the present invention, the upper surface processing transporter may have a fourth belt conveyor on the upstream side and a fifth belt conveyor on the downstream side, the fourth and fifth belt conveyors being respectively located above the sixth belt conveyor and the seventh belt conveyor and aligned in the transport direction. The upper surface processing transporter may transport the substrate while sandwiching the substrate between the fourth belt conveyor on the upper side and the sixth belt conveyor on the lower side and between the fifth belt conveyor on the upper side and the seventh belt conveyor on the lower side, and the upper surface rotary blade may be located between the fourth belt conveyor and the fifth belt conveyor.

Furthermore, in the present invention, the substrate processing apparatus for separating an electronic component from both surfaces of a substrate with the electronic component attached to the upper and lower surfaces may include: a lower surface processing device that separates the electronic component from the lower surface of the substrate; and the upper surface processing device. One of the lower surface processing device and the upper surface processing device may be located on the upstream side in the direction in which the substrate is transported, and the other processing device may be located on the downstream side in the direction in which the substrate is transported. The lower surface processing device may have a lower surface processing transporter that transports the substrate from the upstream side to the downstream side and a lower surface rotary blade that separates the electronic component from the lower surface of the substrate.

Furthermore, in the present invention, the upper surface processing device may be located downstream of the lower surface processing device. The lower surface processing transporter may have a first belt conveyor located on the upper side, and a second belt conveyor on the upstream side and a third belt conveyor on the downstream side, the second and third belt conveyors being located on the lower side and aligned in the transport direction. The lower surface processing transporter may transport the substrate while sandwiching the substrate between the first belt conveyor on the upper side and the second belt conveyor and third belt conveyor on the lower side, and the lower surface rotary blade may be located between the second belt conveyor and the third belt conveyor.

Furthermore, in the present invention, the lower surface processing transporter may have an adjustment roller and two auxiliary rods located inside the first belt conveyor. The adjustment roller may be located above the lower surface rotary blade and capable of vertical positional adjustment with respect to the lower surface rotary blade. The auxiliary rods may be located upstream and downstream of the adjustment roller and have fixed vertical positions with respect to the lower surface rotary blade.

Furthermore, in the present invention, between an outlet of the lower surface processing device and an inlet of the upper surface processing device, there may be a difference in the height at which the substrate is transported.

Furthermore, in the present invention, between an outlet of the fourth belt conveyor and sixth belt conveyor and an inlet of the fifth belt conveyor and seventh belt conveyor, there may be a difference in the height at which the substrate is transported.

Furthermore, in the present invention, the transport height of the substrate at the inlet of the fifth belt conveyor and seventh belt conveyor may be higher than the transport height of the substrate at the outlet of the fourth belt conveyor and sixth belt conveyor.

Furthermore, in the present invention, the sixth belt conveyor may have a downstream end extending to the lower side of the upper surface rotary blade, and an upper surface inclined upward toward the downstream side.

Advantageous Effects of Invention

An apparatus according to the present invention, which includes the upper surface processing device, has the sixth belt conveyor and the seventh belt conveyor, the downstream portion of the upper surface rotary blade facing the gap between the sixth belt conveyor and the seventh belt conveyor. Thus, the component on the upper surface of the substrate is peeled off by the upper surface rotary blade. While the component is peeled off, the substrate is held by the sixth belt conveyor and the substrate sent further downstream is held by the seventh belt conveyor, thereby maintaining the substrate in a horizontal orientation and ensuring the separation of the component. Then the substrate is sent downstream by the seventh belt conveyor, and the component separated from the substrate falls from between the sixth belt conveyor and the seventh belt conveyor, thereby allowing smooth recovery of each of the substrate and the component.

Furthermore, with the configuration in which the upper surface processing transporter has the fourth belt conveyor located above the sixth belt conveyor, the substrate is sandwiched between the upper and lower belt conveyors upstream of the upper surface rotary blade. Thus, the substrate enters the upper surface rotary blade while being firmly held in the horizontal orientation, and therefore the component is more reliably separated.

Moreover, with the configuration in which the upper surface processing transporter has the fifth belt conveyor located above the seventh belt conveyor, the substrate is sandwiched between the upper and lower belt conveyors downstream of the upper surface rotary blade. Thus, the substrate having passed through the upper surface rotary blade is firmly held in the horizontal orientation, and therefore the component is more reliably separated.

Furthermore, with the configuration in which the upper surface processing transporter has the fourth belt conveyor on the upstream side and the fifth belt conveyor on the downstream side, which are located above the sixth belt conveyor and the seventh belt conveyor and aligned in the transport direction, the substrate is sandwiched between the upper and lower belt conveyors upstream and downstream of the upper surface rotary blade. Thus, the substrate enters the upper surface rotary blade while being firmly held in the horizontal orientation, and the substrate having passed through the upper surface rotary blade is firmly held in the horizontal orientation. Therefore, the component is more reliably separated.

The apparatus according to the present invention, which includes the lower surface processing device and the upper surface processing device arranged on the upstream side and the downstream side, respectively, is capable of separating the component from both sides of the substrate in a single operation.

Furthermore, with the configuration in which the lower surface processing transporter has the first belt conveyor located on the upper side and extending from the upstream side to the downstream side, the substrate can be more stably transported. In addition, since the lower surface processing device is located upstream, the thick substrate having both the upper and lower surfaces unprocessed can be more stably transported by the lower surface processing transporter. Furthermore, with the configuration in which the lower surface processing device has the lower surface rotary blade located between the two belt conveyors on the lower side, the component separated by the lower surface processing device falls from between the belt conveyors on the lower side and the lower surface rotary blade, and thus can be smoothly recovered.

Furthermore, with the configuration in which the lower surface processing transporter has the adjustment roller and the auxiliary rods, even if an upward impact force is generated due to, for example, a large component attached to the substrate, during the separation of the component by the lower surface rotary blade, the two fixed auxiliary rods receive the force, thereby allowing smooth processing and preventing damage to the first belt conveyor 1 on the upper side.

Furthermore, with the configuration in which there is a difference in the height at which the substrate is transported between the upstream side and the downstream side, the transport speed is reduced when the substrate passes through the area, and the component is more reliably separated by the upper surface rotary blade.

Furthermore, with the configuration in which the height at which the substrate is transported at the inlet of the fifth belt conveyor and seventh belt conveyor is higher than that of the substrate at the outlet of the fourth belt conveyor and sixth belt conveyor, when passing through under the upper surface rotary blade, the substrate is inclined in an orientation with the rear lifted, and thus the upper surface rotary blade more reliably comes into contact with the upper surface of the substrate to separate the component.

Moreover, with the configuration in which the sixth belt conveyor has a downstream end extending to the lower side of the upper surface rotary blade and is inclined upward toward the downstream side, the substrate is held by the sixth belt conveyor and is transported so as to approach the upper surface rotary blade by the inclination of the sixth belt conveyor during the separation of the component by the upper surface rotary blade. Thus, the component is more reliably separated by the upper surface rotary blade. The substrate processing apparatus according to the present invention comprises one or more of the above-mentioned configurations in any possible combinations thereof.

BRIEF DESCRIPTION OF DRAWINGS

FIG. 9 is an enlarged view of the lower surface processing device of a substrate processing apparatus according to a fifth embodiment.

DESCRIPTION OF EMBODIMENTS

Figure 1A:
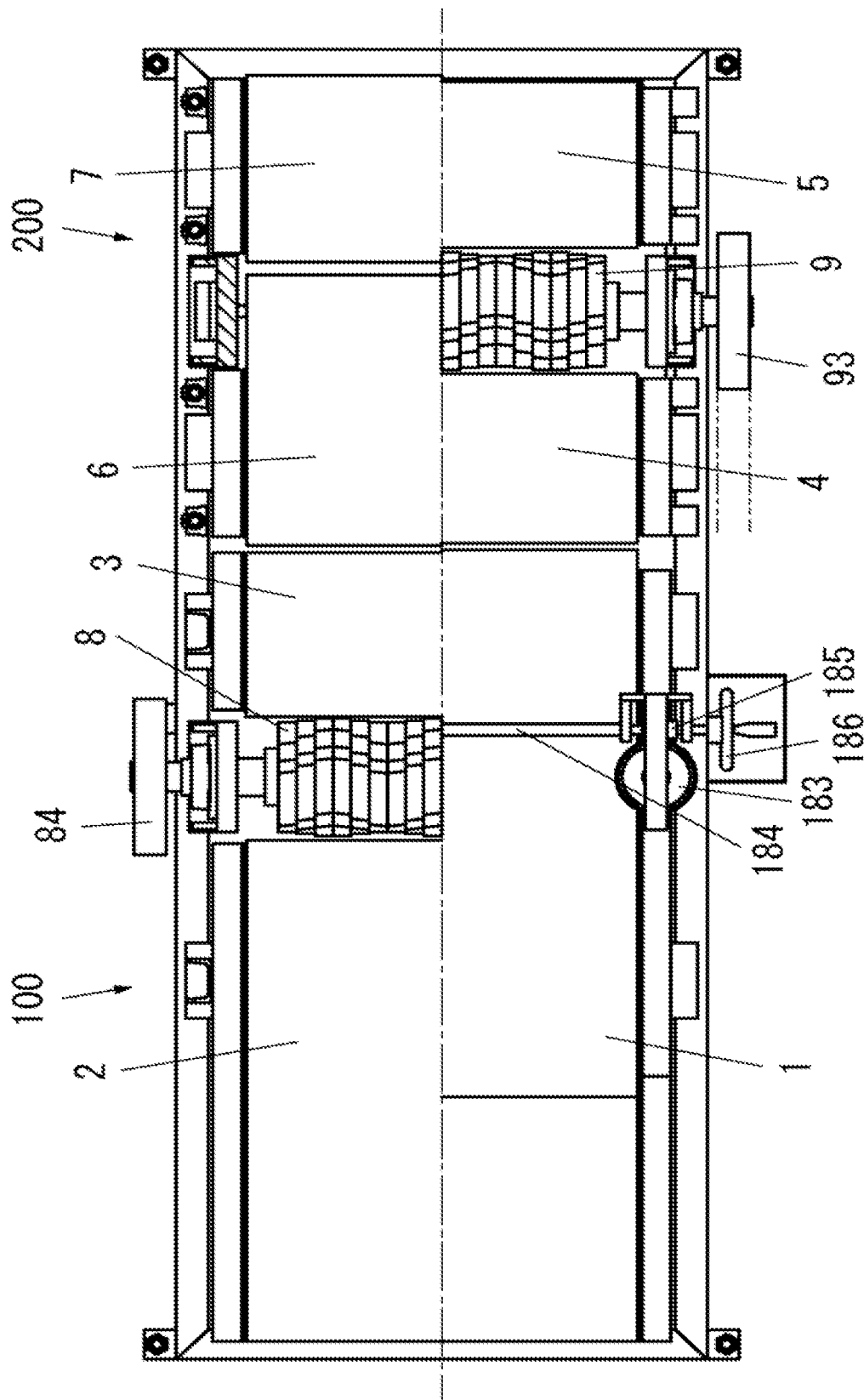
FIG. 1A shows a substrate processing apparatus according to a first embodiment of the present invention, in which is a plan view (the upper half of the drawing shows belt conveyors on the upper side in a transparent state).
Figure 1B:
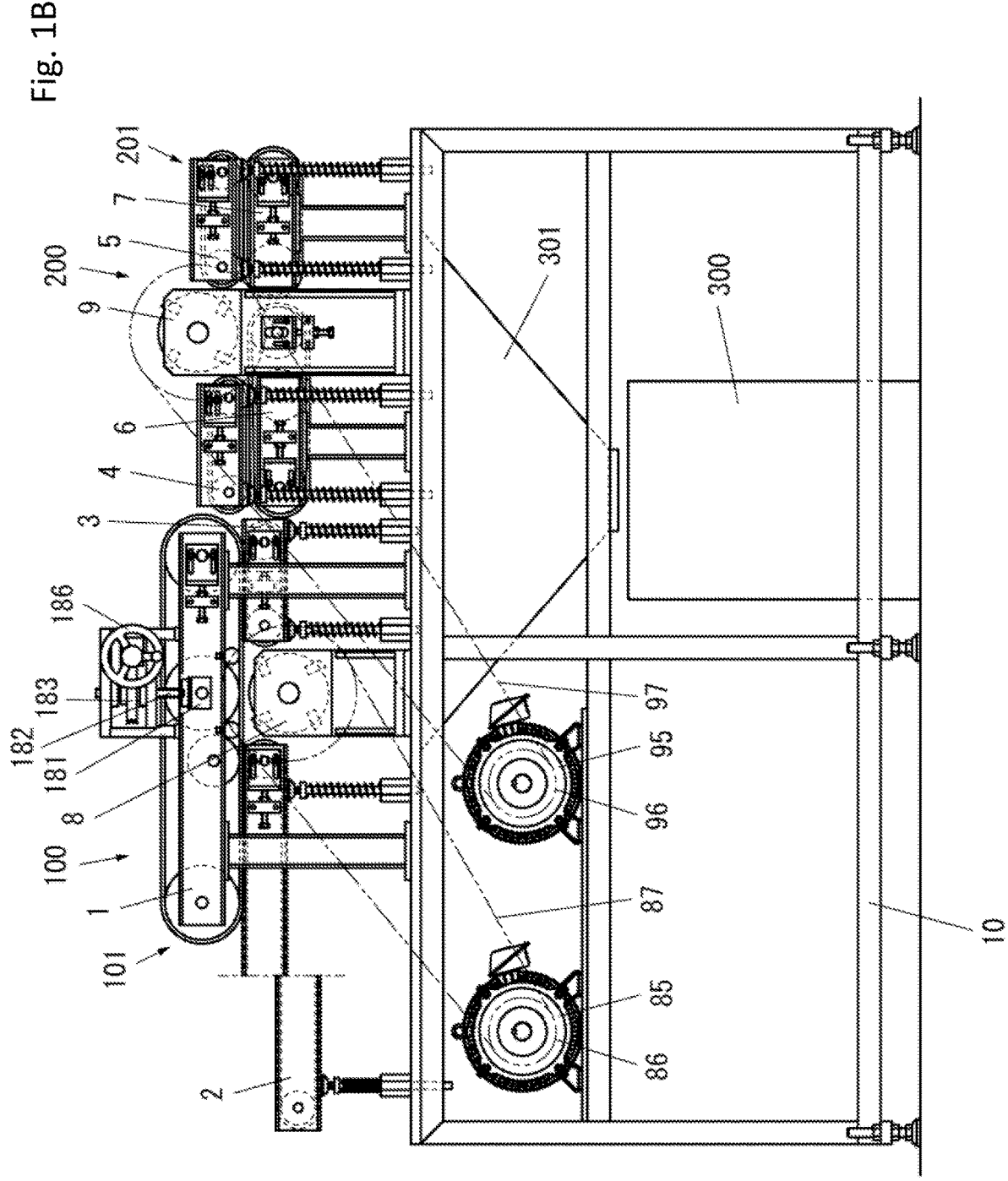
FIG. 1B is a side view of the first embodiment shown in FIG. 1A.

Hereinafter, the specific contents of a substrate processing apparatus of the present invention will be described. Note that, in the following description, the upstream side in the direction in which a substrate is transported is referred to as the front side, the downstream side is referred to as the rear side, and left and right indicate the left and right directions when the apparatus is viewed from the front side. In addition, it is assumed that the substrate is transported in a substantially horizontal state, and electronic components are attached to the upper surface and the lower surface thereof. As shown in FIG. 1, the substrate processing apparatus according to a first embodiment includes a lower surface processing device 100 and an upper surface processing device 200, and the upper surface processing device 200 is located behind (downstream of) the lower surface processing device 100. The lower surface processing device 100 and the upper surface processing device 200 are installed on a frame 10. The frame 10 is a substantially rectangular parallelepiped frame structure with a top panel on the top.

Figure 2:
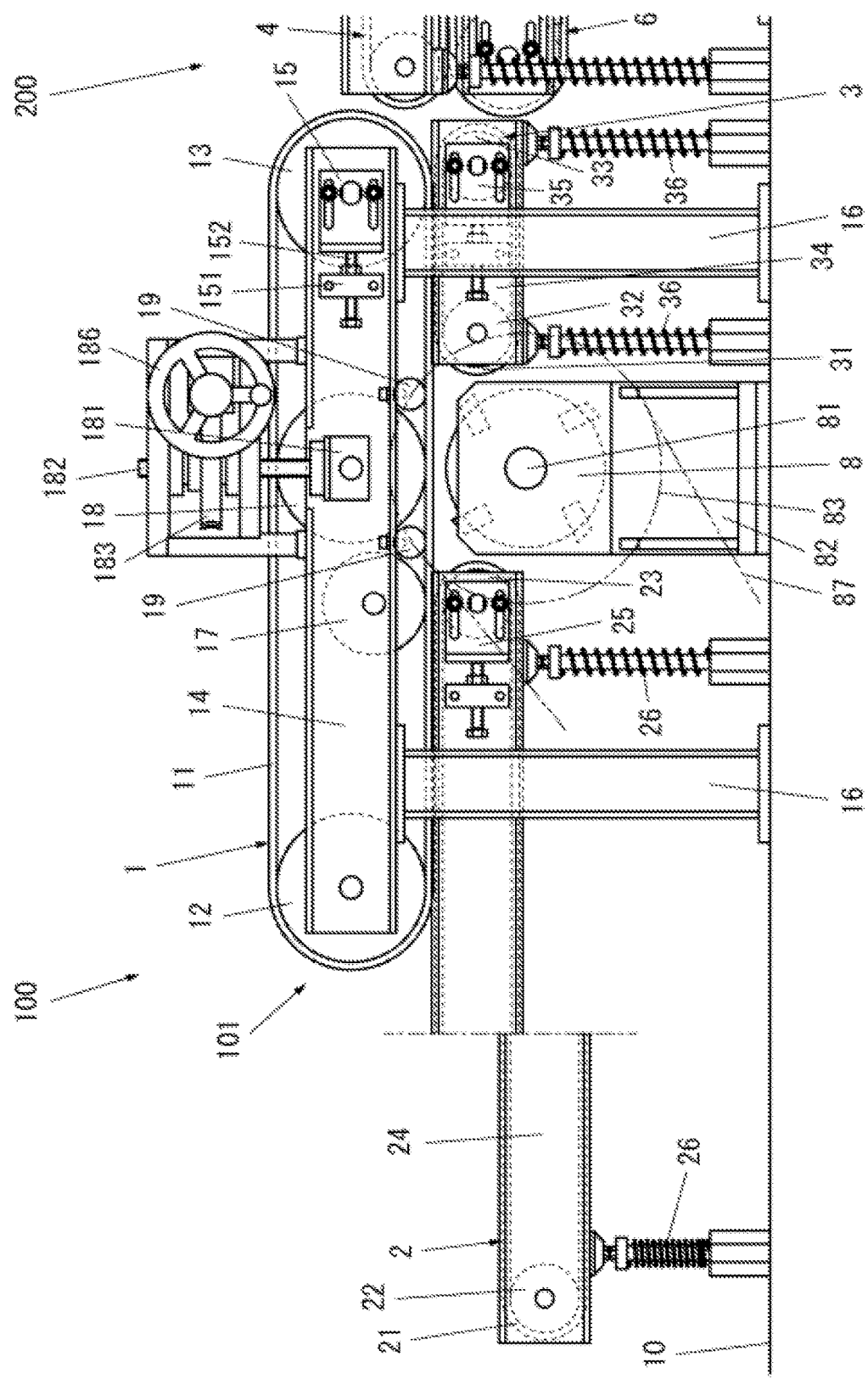
FIG. 2 is an enlarged view of a lower surface processing device.

First, the lower surface processing device 100 will be described. The lower surface processing device 100 is for separating an electronic component from the lower surface of the substrate. As shown in FIGS. 1 and 2, the lower surface processing device 100 includes a first belt conveyor 1 on the upper side, a second belt conveyor 2 and third belt conveyor 3 on the lower side, and a lower surface rotary blade 8. The second belt conveyor 2 and the third belt conveyor 3 are aligned in the front-rear direction (the direction in which the substrate is transported), the second belt conveyor 2 is located below the front portion of the first belt conveyor 1, and the third belt conveyor 3 is located below the rear portion of the first belt conveyor 1. Furthermore, the lower surface rotary blade 8 is located between the second belt conveyor 2 and the third belt conveyor 3. The substrate is transported while being sandwiched between the first belt conveyor 1, and the second belt conveyor 2 and the third belt conveyor 3. The first belt conveyor 1, the second belt conveyor 2, and the third belt conveyor 3 constitute a lower surface processing transporter 101.

The first belt conveyor 1 has an endless belt 11 extending in the front-rear direction, and end rollers 12 and 13 provided at front and rear ends inside the endless belt 11. The end rollers 12 and 13 rotate about the left-right axis, and have approximately the same width as the endless belt 11. A motor is built in the rear end roller 13, and the drive of the rear end roller 13 circulates the endless belt 11. The circulation direction is the direction in which the lower surface of the endless belt 11 moves rearward (counterclockwise direction in FIG. 1B). Furthermore, beam members 14 extending in the front-rear direction are provided on the left and right sides of the first belt conveyor 1, the left and right ends of the front end roller 12 are rotatably supported by the beam members 14, and the left and right ends of the rear end roller 13 are rotatably supported by plate-like bearings 15 that are attached to the beam members 14. In addition, the bearings 15 are movable in the front-rear direction with respect to the beam members 14. More specifically, each of the bearings 15 is bolted to the beam member 14, and the bolt holes are elongate holes that extend in the front-rear direction. In addition, a rectangular parallelepiped support 151 is fixed to the side of the beam member 14 forward of the bearing 15. A bolt 152 is screwed into the support 151 from the front, the bolt 152 penetrates the support 151 in the front-rear direction, and the tip (rear end) of the bolt 152 is in contact with the bearing 15 from the front. With this configuration, when the bolt 152 is screwed in, the bolt 152 moves rearward, which causes the bearing 15 to move rearward. That is, by screwing in the bolts 152, the rear end roller 13 is moved rearward and tension in the front-rear direction is applied to the endless belt 11 (the bolts for fixing the bearings 15 to the beam members 14 are moved in a loosened state, and then tightened). In addition, the left and right beam members 14 are attached to the upper surface of the frame 10 by support columns 16 that are provided at the front and at the rear.

The second belt conveyor 2 has an endless belt 21 extending in the front-rear direction, and end rollers 22 and 23 provided at front and rear ends inside the endless belt 21. The endless belt 21 has approximately the same length in the front-rear direction and width in the left-right direction as the endless belt 11 of the first belt conveyor 1, and is accommodated between the left and right support columns 16. The upper surface of the endless belt 21 of the second belt conveyor 2 is in facing contact with the lower surface of the endless belt 11 of the first belt conveyor 1. However, the front end of the second belt conveyor 2 is located further forward than the front end of the first belt conveyor 1, and substantially half of the entire length of the second belt conveyor 2 protrudes forward. The end rollers 22 and 23 rotate about the left-right axis, and have approximately the same width as the endless belt 21, and have a smaller diameter than the end rollers 12 and 13 of the first belt conveyor 1. A motor is built in the rear end roller 23, and the drive of the rear end roller 23 circulates the endless belt 21. The circulation direction is the direction in which the upper surface of the endless belt 21 moves rearward (clockwise direction in FIG. 1B). Furthermore, beam members 24 extending in the front-rear direction are provided on the left and right sides of the second belt conveyor 2, the left and right ends of the front end roller 22 are rotatably supported by the beam members 24, and the left and right ends of the rear end roller 23 are rotatably supported by plate-like bearings 25 that are attached to the beam members 24. The configuration of the bearings 25 is similar to that of the bearings 15 of the first belt conveyor 1, and the bearings 25 apply tension in the front-rear direction to the endless belt 21. In addition, the left and right beam members 24 are attached to the upper surface of the frame 10 by support dampers 26 that are provided at the front and at the rear. The support dampers 26 are spring dampers, and the elastic force of the spring presses, from below, the second belt conveyor 2 against the first belt conveyor 1. It should be noted that in FIGS. 1B and 2, the front portion of the second belt conveyor 2 (the portion in front of the alternate long and short dash line) represents a state in which the support dampers 26 are contracted and the second belt conveyor 2 is lowered.

The third belt conveyor 3 has an endless belt 31 extending in the front-rear direction, and end rollers 32 and 33 provided at front and rear ends inside the endless belt 31. The endless belt 31 has a length in the front-rear direction that is approximately ⅓ of the length of the endless belt 11 of the first belt conveyor 1, and approximately the same width in the left-right direction as the endless belt 11 of the first belt conveyor 1, and is accommodated between the left and right support columns 16. The upper surface of the endless belt 31 of the third belt conveyor 3 is in facing contact with the lower surface of the endless belt 11 of the first belt conveyor 1. However, the front end of the third belt conveyor 3 is separated from the rear end of the second belt conveyor 2, and the rear end of the third belt conveyor 3 is at approximately the same front-rear position as the rear end of the first belt conveyor 1. The end rollers 32 and 33 rotate about the left-right axis, have approximately the same width as the endless belt 31, and have the same diameter as the end rollers 22 and 23 of the second belt conveyor 2. A motor is built in the rear end roller 33, and the drive of the rear end roller 33 circulates the endless belt 31. The circulation direction is the direction in which the upper surface of the endless belt 31 moves rearward (clockwise direction in FIG. 1B). Furthermore, beam members 34 extending in the front-rear direction are provided on the left and right sides of the third belt conveyor 3, the left and right ends of the front end roller 32 are rotatably supported by the beam members 34, and the left and right ends of the rear end roller 33 are rotatably supported by plate-like bearings 35 that are attached to the beam members 34. The configuration of the bearings 35 is similar to that of the bearings 15 of the first belt conveyor 1, and the bearings 35 apply tension in the front-rear direction to the endless belt 31. In addition, the left and right beam members 34 are attached to the upper surface of the frame 10 by support dampers 36 that are provided at the front and at the rear. The support dampers 36 are spring dampers, and the elastic force of the spring presses, from below, the third belt conveyor 3 against the first belt conveyor 1.

The lower surface rotary blade 8 is provided between the second belt conveyor 2 and the third belt conveyor 3, below the first belt conveyor 1. The lower surface rotary blade 8 rotates about the left-right axis, the rotation direction is the direction in which the upper surface moves rearward (clockwise direction in FIG. 1B) similarly to the second belt conveyor 2 and the third belt conveyor 3, and the upper surface is slightly separated from the lower surface of the endless belt 11 of the first belt conveyor 1. More specifically, the lower surface rotary blade 8 has a rotary shaft 81 extending in the left-right direction at the center, and the left and right portions of the rotary shaft 81 are rotatably supported by support walls 82 that are fixed to the left and right of the upper surface of the frame 10. Furthermore, the left and right ends of the rotary shaft 81 protrude further outward than the support walls 82, a pulley 83 is attached to the right end, and a counterweight 84 is attached to the left end. In addition, a motor 85 is installed at the front inside the frame 10, a pulley 86 is also attached to the drive shaft of the motor 85, and a drive belt 87 is stretched between the pulley 83 of the lower surface rotary blade 8 and the pulley 86 of the motor 85. The lower surface rotary blade 8 is rotated by driving the motor 85.

Figure 4A:
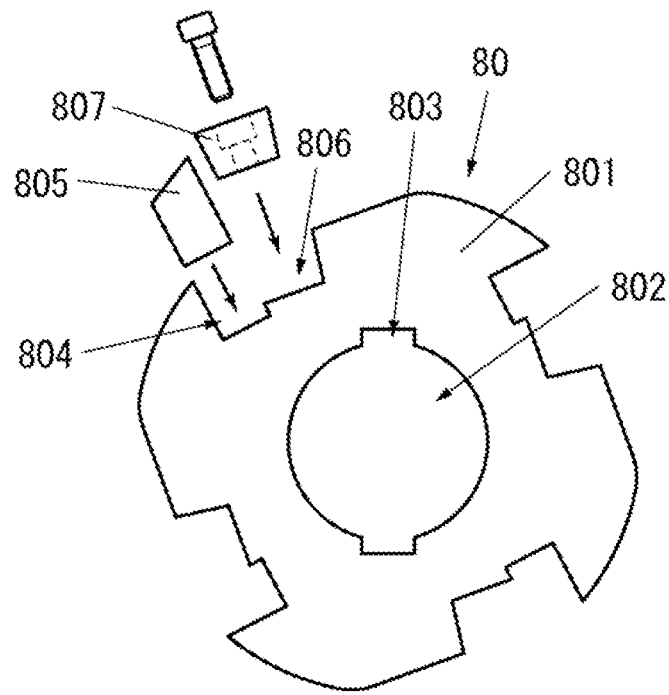
FIG. 4A shows details of a rotary blade, in which is a side view of a rotor (before cutting blades are mounted).
Figure 4B:
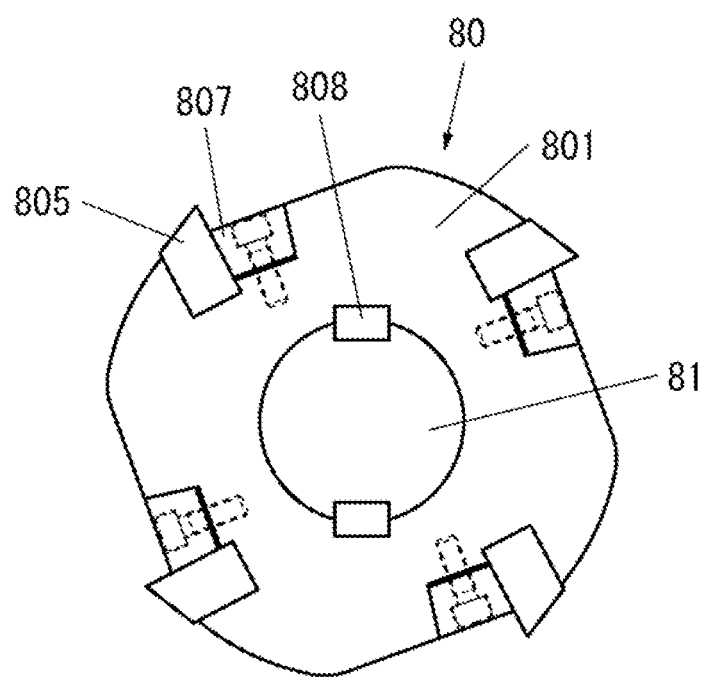
FIG. 4B is a side view of the rotor (after the cutting blades are mounted).
Figure 4C:
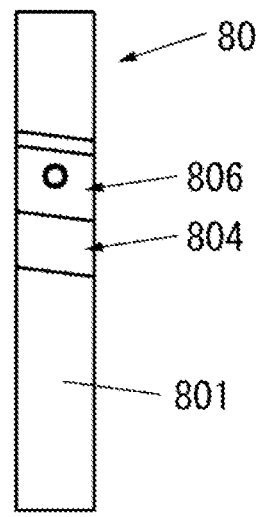
FIG. 4C is a front view of the rotor.
Figure 4D:
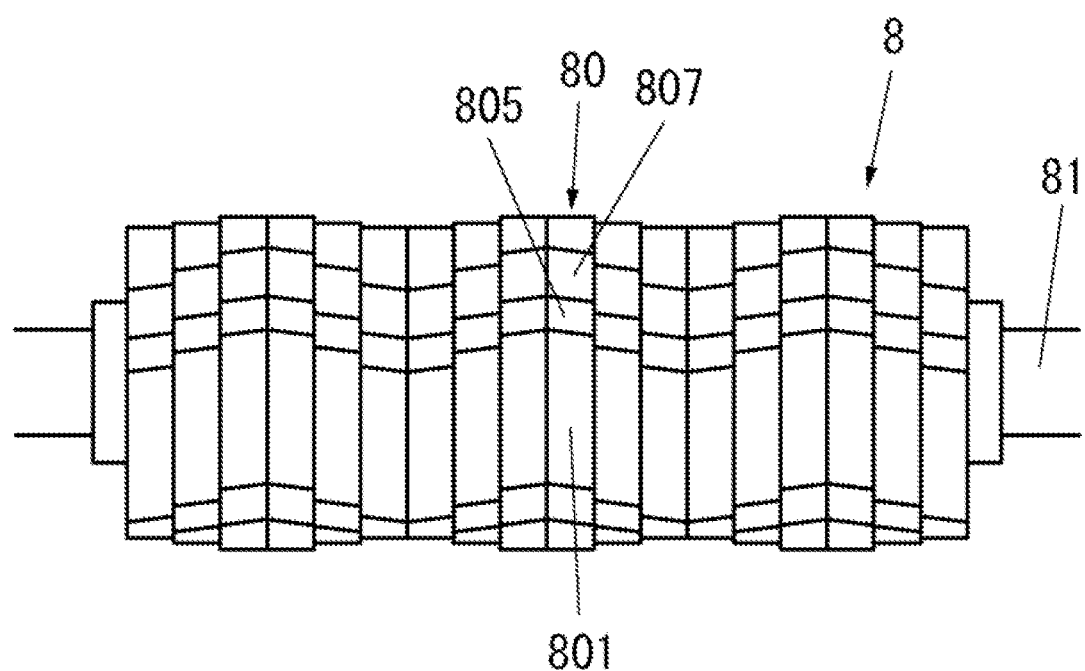
FIG. 4D is a front view of the rotary blade.

For more details about the configuration of the lower surface rotary blade 8, eighteen rotors 80 are attached in a row in the left-right direction to the portion of the rotary shaft 81 between the left and right support walls 82. As shown in FIG. 4A, each of the rotors 80 includes a plate-shaped rotor body 801, an insertion hole 802 through which the rotary shaft 81 passes is formed at the center of the rotor body 801, and key grooves 803 are formed at the edge of the insertion hole 802. In addition, in the peripheral edge of the rotor body 801, cutting blade cutouts 804 are formed at intervals of 90 degrees around the central axis (insertion hole 802), and as shown in FIGS. 4A and 4B, a cutting blade 805 is attached to each of the cutting blade cutouts 804. Each of the cutting blade cutouts 804 has a depth such that the tip of the inserted cutting blade 805 protrudes from the peripheral edge of the rotor body 801, and also has a side wall surface inclined so that the blade edge of the cutting blade 805 is inclined with respect to the rotation direction of the lower surface rotary blade 8 as shown in FIG. 4C. Also formed forward of the cutting blade cutout 804 in the rotation direction (clockwise direction in FIG. 4A) is a fixed piece cutout 806 in communication with the cutting blade cutout 804. The fixed piece cutout 806 has a shape expanding toward the opening side (outer peripheral side), and after the cutting blade 805 is inserted into the cutting blade cutout 804, a substantially trapezoidal fixed piece 807 is inserted into the fixed piece cutout 806 and bolted to the rotor body 801, and thus the cutting blade 805 is fixed to the rotor body 801. Further, the position (the angular position in the circumferential direction) of the key grooves 803 with respect to the position of the cutting blades 805 is different for each of the rotors 80. There are three types of rotors 80 in which the cutting blades 805 are formed in the different angular positions from each other, and further, each of the three types includes two different rotors having the same angular positions of the cutting blades 805, but formed in symmetrical shapes with respect to the left and right direction. Those six rotors are used as one set, and three sets of the rotors as a total of 18 are used to make the lower surface rotary blade 8. The width in the left-right direction obtained by combining the eighteen rotors 80 is slightly narrower than the width in the left-right direction of the endless belt 11 of the first belt conveyor 1. The rotors 80 are aligned in a row as shown in FIG. 4D, with the cutting blades 805 arranged in a corrugation, and fixed by keys 808 so as to rotate integrally with the rotary shaft 81. It should be noted that the arrangement pattern of the cutting blades 805 can be changed by changing the order in which the rotors 80 are attached to the rotary shaft 81.

Furthermore, a pressing roller 17 is provided at a position above the rear end roller 23 of the second belt conveyor 2, inside the endless belt 11 of the first belt conveyor 1. The pressing roller 17 rotates about the left-right axis, has approximately the same width as the endless belt 11, and has left and right ends rotatably supported by the beam members 14. In addition, the pressing roller 17 has a smaller diameter than the end rollers 12 and 13 of the first belt conveyor 1 and a central axis that is shifted downward from the central axes of the end rollers 12 and 13, and presses the lower surface of the endless belt 11 of the first belt conveyor 1 against the upper surface of the endless belt 21 of the second belt conveyor 2.

Further, as shown in FIG. 2, an adjustment roller 18 is provided at a position above the lower surface rotary blade 8, inside the endless belt 11 of the first belt conveyor 1. The adjustment roller 18 rotates about the left-right axis, has approximately the same width as the endless belt 11, and has left and right ends rotatably supported by bearings 181 attached to the beam members 14. Furthermore, the adjustment roller 18 has the same diameter as the end rollers 12 and 13 of the first belt conveyor 1. In addition, the bearings 181 are vertically movable with respect to the beam members 14. More specifically, as shown in FIGS. 1 and 2, screw rods 182 extending upward are attached to the left and right bearings 181, and helical gears 183 are screwed to the screw rods 182. A shaft 184 that extends left and right and is rotatable about the left-right axis is provided at the rear of the helical gears 183, and worm gears 185 are attached at positions on the shaft 184 corresponding to the left and right helical gears 183, and the helical gears 183 and the worm gears 185 mesh with each other. A handle 186 is attached to the right end of the shaft 184. With this configuration, when the handle 186 is rotated, the shaft 184 and the right and left worm gears 185 also rotate, and the helical gears 183 also rotate. Then, since the screw rods 182 screwed into the left and right helical gears 183 move up and down, the bearings 181 also move up and down. That is, by rotating the handle 186, the right and left bearings 181 are moved up and down to adjust the vertical position of the adjustment roller 18 with respect to the lower surface rotary blade 8, thereby enabling adjustment of the distance between the endless belt 11 of the first belt conveyor 1 and the lower surface rotary blade 8.

Furthermore, as shown in FIG. 2, auxiliary rods 19 are provided at positions in front of and behind the adjustment roller 18, inside the endless belt 11 of the first belt conveyor 1. Each of the auxiliary rods 19 is a round rod extending left and right, and fixed to the lower surfaces of the left and right beam members 14. That is, the vertical position of the auxiliary rod 19 with respect to the lower surface rotary blade 8 is fixed. Furthermore, the auxiliary rod 19 has a smaller diameter than the adjustment roller 18 and the pressing roller 17, and is in contact with the lower travel portion of the endless belt 11 from inside (above).

Figure 3:
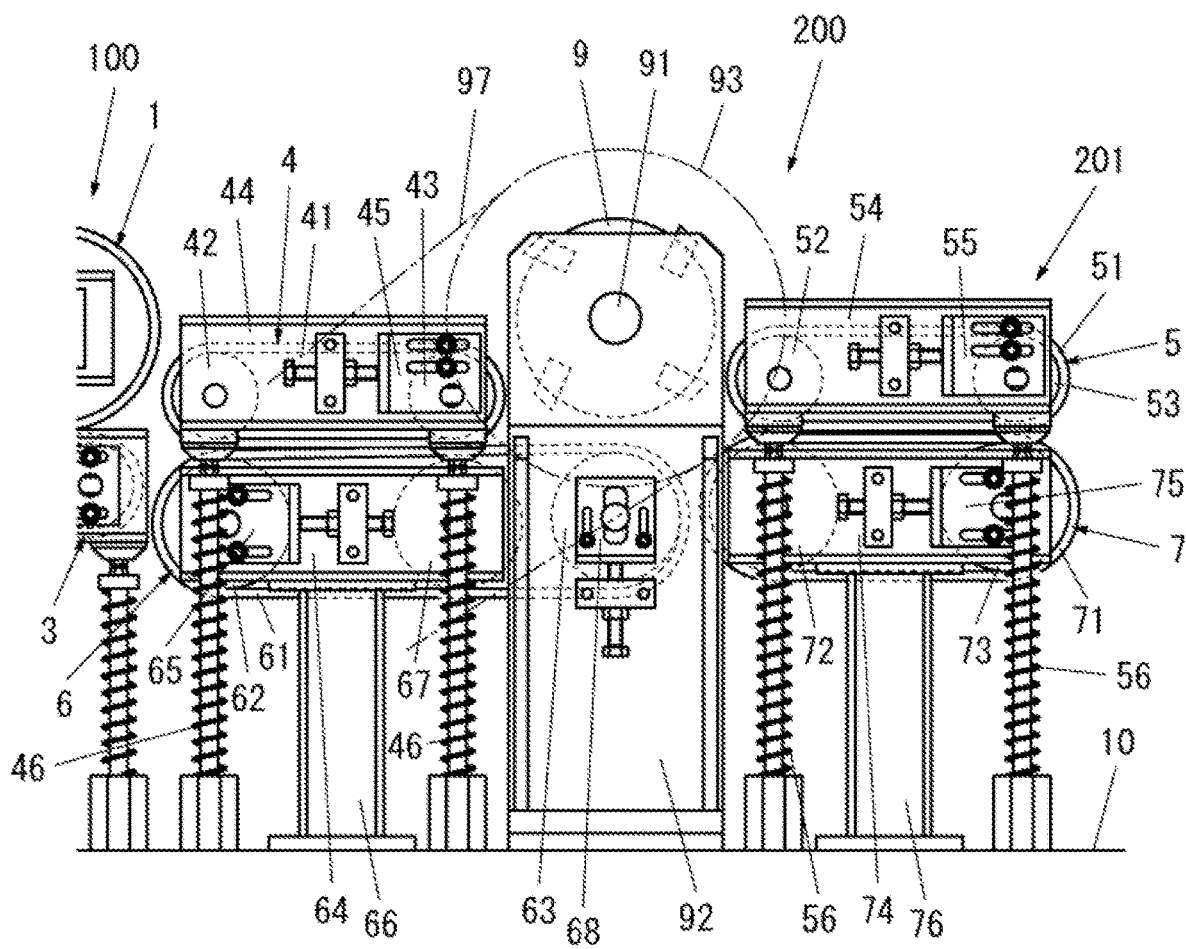
FIG. 3 is an enlarged view of an upper surface processing device.

Next, the upper surface processing device 200 will be described. The upper surface processing device 200 is for separating the electronic component from the upper surface of the substrate. As shown in FIGS. 1 and 3, the upper surface processing device 200 includes a fourth belt conveyor 4 and fifth belt conveyor 5 on the upper side, a sixth belt conveyor 6 and seventh belt conveyor 7 on the lower side, and an upper surface rotary blade 9. The fourth belt conveyor 4 and the fifth belt conveyor 5 are aligned in the front-rear direction (direction in which the substrate is transported), the sixth belt conveyor 6 and the seventh belt conveyor 7 are also aligned in the front-rear direction (direction in which the substrate is transported), the sixth belt conveyor 6 is located below the fourth belt conveyor 4, and the seventh belt conveyor 7 is located below the fifth belt conveyor 5. Furthermore, the upper surface rotary blade 9 is located between the fourth belt conveyor 4 and the fifth belt conveyor 5, and the rear portion of the upper surface rotary blade 9 faces the gap between the sixth belt conveyor 6 and the seventh belt conveyor 7. In addition, the substrate is transported while being sandwiched between the fourth belt conveyor 4 and the sixth belt conveyor 6 and between the fifth belt conveyor 5 and the seventh belt conveyor 7.

The fourth belt conveyor 4, the fifth belt conveyor 5, the sixth belt conveyor 6 and the seventh belt conveyor 7 constitute an upper surface processing transporter 201.

The fourth belt conveyor 4 and the fifth belt conveyor 5 have the same structure, and will be described together. The fourth belt conveyor 4 (fifth belt conveyor 5) has an endless belt 41 (51) extending in the front-rear direction, and end rollers 42 and 43 (52 and 53) provided at front and rear ends inside the endless belt 41 (51). The endless belt 41 (51) has approximately the same length in the front-rear direction as the endless belt 31 of the third belt conveyor 3 of the lower surface processing device 100, and has approximately the same width in the left-right direction as the endless belt 11 of the first belt conveyor 1 of the lower surface processing device 100. The end rollers 42 and 43 (52 and 53) rotate about the left-right axis, have approximately the same width as the endless belt 41 (51), and have the same diameter as the end rollers 22 and 23 of the second belt conveyor 2 of the lower surface processing device 100. A motor is built in the rear end roller 43 (53), and the drive of the rear end roller 43 (53) circulates the endless belt 41 (51). The circulation direction is the direction in which the lower surface of the endless belt 41 (51) moves rearward (counterclockwise direction in FIG. 1B). Furthermore, beam members 44 (54) extending in the front-rear direction are provided on the left and right sides of the fourth belt conveyor 4 (fifth belt conveyor 5), the left and right ends of the front end roller 42 (52) are rotatably supported by the beam members 44 (54), and the left and right ends of the rear end roller 43 (53) are rotatably supported by plate-shaped bearings 45 (55) that are attached to the beam members 44 (54). The configuration of the bearings 45 (55) is similar to that of the bearings 15 of the first belt conveyor 1, and the bearings 45 (55) apply tension in the front-rear direction to the endless belt 41 (51). In addition, the left and right beam members 44 (54) are attached to the upper surface of the frame 10 by support dampers 46 (56) that are provided at the front and at the rear. The support dampers 46 (56) are spring dampers, and the elastic force of the spring presses, from above, the fourth belt conveyor 4 (fifth belt conveyor 5) against the sixth belt conveyor 6 (seventh belt conveyor 7) to be described later.

The sixth belt conveyor 6 has an endless belt 61 extending in the front-rear direction, end rollers 62 and 63 provided at front and rear ends inside the endless belt 61, and an intermediate roller 67 provided between both end rollers 62 and 63. The endless belt 61 is longer in the front-rear direction than the endless belt of the fourth belt conveyor 4, has approximately the same width in the left-right direction as the endless belt 41 of the fourth belt conveyor 4, and is accommodated between the left and right support dampers 46. The upper surface of the endless belt 61 of the sixth belt conveyor 6 is in facing contact with the lower surface of the endless belt 41 of the fourth belt conveyor 4. However, the front end of the sixth belt conveyor 6 is at approximately the same front-rear position as the front end of the fourth belt conveyor 4, and the rear end of the sixth belt conveyor 6 is located behind the rear end of the fourth belt conveyor 4. The end rollers 62 and 63 and the intermediate roller 67 rotate about the left-right axis, have approximately the same width as the endless belt 61, and have a smaller diameter than the end rollers 12 and 13 of the first belt conveyor 1 of the lower surface processing device 100 and a larger diameter than the end rollers 22 and 23 of the second belt conveyor 2 of the lower surface processing device 100. A motor is built in the front end roller 62, and the drive of the front end roller 62 circulates the endless belt 61. The circulation direction is the direction in which the upper surface of the endless belt 61 moves rearward (clockwise direction in FIG. 1B). Furthermore, beam members 64 extending in the front-rear direction are provided on the left and right sides of the sixth belt conveyor 6, the left and right ends of the intermediate roller 67 are rotatably supported by the beam members 64, and the left and right ends of the front end roller 62 are rotatably supported by plate-like bearings 65 that are attached to the beam members 64. The configuration of the bearings 65 is similar to that of the bearings 15 of the first belt conveyor 1 and disposed in front-rear symmetric relation thereto, and the bearings 65 apply tension in the front-rear direction to the endless belt 61. It should be noted that the length of the beam member 64 in the front-rear direction is shorter than the length of the endless belt 61 in the front-rear direction, and the left and right ends of the rear end roller 63 are rotatably supported by plate-shaped bearings 68 that are attached to support walls 92 fixed to the left and right of the upper surface of the frame 10. The configuration of the bearings 68 is similar to that of the bearings 15 of the first belt conveyor 1, but in a 90-degree rotated orientation (the orientation in which the bearings 68 move upward when bolts are screwed in), and the bearings 68 apply tension in the vertical direction to the endless belt 61. Additionally, the bearings 68 are capable of vertical positional adjustment such that the rear end roller 63 is positioned above the front end roller 62. With the rear end roller 63 positioned above the front end roller 62, the upper surface of the sixth belt conveyor 6 is inclined upward toward the rear (downstream side). In addition, the left and right beam members 64 are attached to the upper surface of the frame 10 by a support column 66 that is provided at the center in the front-rear direction.

The seventh belt conveyor 7 has an endless belt 71 extending in the front-rear direction, and end rollers 72 and 73 provided at front and rear ends inside the endless belt 71. The endless belt 71 has approximately the same length in the front-rear direction and width in the left-right direction as the endless belt 51 of the fifth belt conveyor 5, and is accommodated between the left and right support dampers 56. The upper surface of the endless belt 71 of the seventh belt conveyor 7 is in facing contact with the lower surface of the endless belt 51 of the fifth belt conveyor 5. However, the front end of the seventh belt conveyor 7 is at approximately the same front-rear position as the front end of the fifth belt conveyor 5, and the rear end of the seventh belt conveyor 7 is at approximately the same front-rear position as the rear end of the fifth belt conveyor 5. The end rollers 72 and 73 rotate about the left-right axis, have approximately the same width as the endless belt 71, and have a smaller diameter than the end rollers 12 and 13 of the first belt conveyor 1 of the lower surface processing device 100 and a larger diameter than the end rollers 22 and 23 of the second belt conveyor 2 of the lower surface processing device 100. A motor is built in the rear end roller 73, and the drive of the rear end roller 73 circulates the endless belt 71. The circulation direction is the direction in which the upper surface of the endless belt 71 moves rearward (clockwise direction in FIG. 1B). Furthermore, beam members 74 extending in the front-rear direction are provided on the left and right sides of the seventh belt conveyor 7, the left and right ends of the front end roller 72 are rotatably supported by the beam members 74, and the left and right ends of the rear end roller 73 are rotatably supported by plate-like bearings 75 that are attached to the beam members 74. The configuration of the bearings 75 is similar to that of the bearings 15 of the first belt conveyor 1, and the bearings 75 apply tension in the front-rear direction to the endless belt 71. In addition, the left and right beam members 74 are attached to the upper surface of the frame 10 by a support column 76 that is provided at the center in the front-rear direction.

It should be noted that the upper surface of the endless belt 61 of the sixth belt conveyor 6 is located below the lower surface of the endless belt 11 of the first belt conveyor 1. That is, between the outlet of the first belt conveyor 1 and third belt conveyor 3 and the inlet of the fourth belt conveyor 4 and sixth belt conveyor 6, there is a difference in the height at which the substrate is transported (higher at the rear). This step height is equal to or less than the radius of the end rollers 22 and 23 of the second belt conveyor 2. Furthermore, the upper surface of the endless belt 71 of the seventh belt conveyor 7 is located above the upper surface of the endless belt 61 of the sixth belt conveyor 6 (the support column 76 of the seventh belt conveyor 7 is higher than the support column 66 of the sixth belt conveyor 6). That is, between the outlet of the fourth belt conveyor 4 and sixth belt conveyor 6 and the inlet of the fifth belt conveyor 5 and seventh belt conveyor 7, there is a difference in the height at which the substrate is transported (lower at the rear). This step height is equal to or less than the radius of the end rollers 22 and 23 of the second belt conveyor 2.

The upper surface rotary blade 9 is provided between the fourth belt conveyor 4 and the fifth belt conveyor 5, and faces directly above the rear end roller 63 of the sixth belt conveyor 6. Furthermore, the rear portion of the upper surface rotary blade 9 faces the gap between the sixth belt conveyor 6 and the seventh belt conveyor 7. The upper surface rotary blade 9 rotates about the left-right axis, and the rotation direction is the direction in which the lower surface moves rearward (counterclockwise direction in FIG. 1B) similarly to the fourth belt conveyor 4 and the fifth belt conveyor 5. More specifically, the upper surface rotary blade 9 has a rotary shaft 91 extending in the left-right direction at the center, and the left and right portions of the rotary shaft 91 are rotatably supported by support walls 92 that are fixed to the left and right of the upper surface of the frame 10 (attached to the upper portions of the bearings 68 of the sixth belt conveyor 6). Furthermore, the left and right ends of the rotary shaft 91 protrude further outward than the support walls 92, a pulley 93 is attached to the right end, and a counterweight (not shown) is attached to the left end. In addition, a motor 95 is installed at the front inside the frame 10, a pulley 96 is also attached to the drive shaft of motor 95, and a drive belt 97 is stretched between the pulley 93 of the upper surface rotary blade 9 and the pulley 96 of the motor 95. The upper surface rotary blade 9 is rotated by driving the motor 95. The more detailed configuration of the upper surface rotary blade 9 itself is the same as that of the lower surface rotary blade 8 shown in FIG. 4, and the description thereof will not be given here.

Also provided inside the frame 10 is a funnel 301 that is open at the top and bottom and has a tapered shape toward the bottom. The upper opening end of the funnel 301 extends from below the lower surface rotary blade 8 to below the upper surface rotary blade 9. In addition, a recovery box 300 is installed below the lower opening of the funnel 301. Thus, the components separated from the substrate by the lower surface rotary blade 8 and the upper surface rotary blade 9 are recovered in the recovery box 300 through the funnel 301. Furthermore, the entire lower surface processing device 100 and upper surface processing device 200 placed on the upper side of the frame 10 are covered with a substantially rectangular parallelepiped cover (not shown). A loading port and a discharge port for the substrate are respectively formed in the front surface and the rear surface of the cover.

Figure 5:
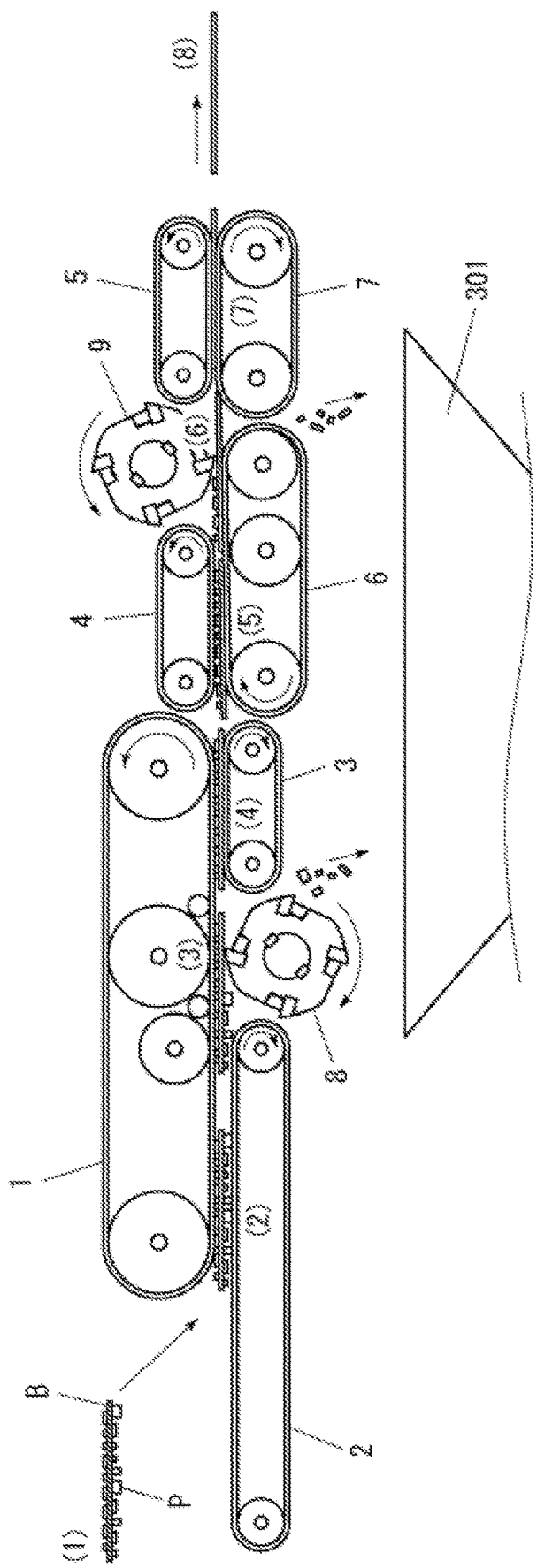
FIG. 5 is an explanatory view of a flow of substrate processing by the substrate processing apparatus.

Subsequently, a process for processing a substrate with the substrate processing apparatus configured in this manner will be described with reference to FIG. 5. This substrate processing apparatus is for separating an electronic component from a printed circuit board with an electronic component, such as an IC, a resistor, and a capacitor, attached to both sides. First, an operator drives all the belt conveyors (the first belt conveyor 1 to the seventh belt conveyor 7) and the rotary blades (the lower surface rotary blade 8 and the upper surface rotary blade 9), and loads a substrate B to be processed from the loading port of the cover. At this time, of both sides of the substrate B, the side to which a larger component P is attached is set to the lower side ((1) in FIG. 5). The substrate B is placed on the front end of the second belt conveyor 2, and transported to the rear while being sandwiched between the first belt conveyor 1 and the second belt conveyor 2 ((2) in FIG. 5). At this time, since the second belt conveyor 2 is supported by the support dampers 26, the second belt conveyor 2 moves up and down as appropriate according to the thickness of the substrate B. After reaching the rear end of the second belt conveyor 2, the substrate B is subsequently sandwiched between the first belt conveyor 1 and the lower surface rotary blade 8 and transported to the rear, and during the transport, the component P on the lower surface is peeled off by the lower surface rotary blade 8 ((3) in FIG. 5). It should be noted that the rotational speed of the lower surface rotary blade 8 is faster than the transport speed of the first belt conveyor 1. The separated component P falls from between the lower surface rotary blade 8 and the third belt conveyor 3, and is recovered in the recovery box 300 through the funnel 301. The substrate B from which the component P has been separated is sandwiched between the first belt conveyor 1 and the third belt conveyor 3 and transported to the rear ((4) in FIG. 5). At this time, since the third belt conveyor 3 is supported by the support dampers 36, the third belt conveyor 3 moves up and down as appropriate according to the thickness of the substrate B. Then after reaching the rear end of the third belt conveyor 3, the substrate B is subsequently sandwiched between the fourth belt conveyor 4 and the sixth belt conveyor 6 and transported further to the rear ((5) in FIG. 5). At this time, since the fourth belt conveyor 4 is supported by the support dampers 46, the fourth belt conveyor 4 moves up and down as appropriate according to the thickness of the substrate B. After reaching the rear end of the fourth belt conveyor 4, the substrate B is subsequently sandwiched between the upper surface rotary blade 9 and the sixth belt conveyor 6 and transported to the rear, and during the transport, the component P on the upper surface is peeled off by the upper surface rotary blade 9 ((6) in FIG. 5). It should be noted that the rotational speed of the upper surface rotary blade 9 is faster than the transport speed of the sixth belt conveyor 6. The separated component P falls from between the sixth belt conveyor 6 and the seventh belt conveyor 7, and is recovered in the recovery box 300 through the funnel 301. The substrate B from which the component P has been separated is sandwiched between the fifth belt conveyor 5 and the seventh belt conveyor 7 and transported to the rear ((7) in FIG. 5). At this time, since the fifth belt conveyor 5 is supported by the support dampers 56, the fifth belt conveyor 5 moves up and down as appropriate according to the thickness of the substrate B. Then after reaching the rear ends of the fifth belt conveyor 5 and the seventh belt conveyor 7, the substrate B is discharged from the discharge port of the cover ((8) in FIG. 5). Thus, the substrate B and the component P are separated. The substrate B and the component P are processed as appropriate, and gold, copper, and the like for use in the pattern on the substrate B are recovered from the substrate B, and rare metals such as tantalum are recovered from the component P.

The substrate processing apparatus according to the first embodiment of the present invention configured in this manner includes the lower surface processing device 100 and the upper surface processing device 200, which are located on the upstream side and the downstream side, respectively. Thus, it is possible to separate the component from both sides of the substrate in a single operation. Furthermore, since the lower surface processing transporter 101 has the single first belt conveyor 1 extending from the upstream side to the downstream side, the lower surface processing transporter 101 can transport the substrate more stably than the upper surface processing transporter 201 in which each of the belt conveyors on the upper and lower sides is divided into two (in the upper surface processing transporter 201, the belt conveyor on the lower side has to be divided into two in order to drop the separated component). In addition, since the lower surface processing device 100 is located on the upstream side, the thick substrate having both the upper and lower surfaces unprocessed can be more stably transported by the lower surface processing transporter 101. Furthermore, since the lower surface processing device 100 has the lower surface rotary blade 8 located between the two belt conveyors (second belt conveyor 2 and third belt conveyor 3) on the lower side, the component separated by the lower surface processing device 100 falls from between the belt conveyors on the lower side and the lower surface rotary blade 8, and thus can be smoothly recovered. Moreover, while the component is peeled off from the substrate in the upper surface processing device 200, the substrate is held by the sixth belt conveyor and then sent further downstream to be held by the seventh belt conveyor. Thus, the substrate maintains a horizontal orientation and the component is reliably separated. Further, since the substrate is sandwiched between the upper and lower belt conveyors upstream and downstream of the upper surface rotary blade 9, the substrate enters the upper surface rotary blade 9 while being firmly held in a horizontal orientation and the substrate having passed through the upper surface rotary blade 9 is held firmly in the horizontal orientation. Therefore, the component is more reliably separated. In addition, since the rear portion of the upper surface rotary blade 9 faces the gap between the two belt conveyors (the sixth belt conveyor 6 and the seventh belt conveyor 7) on the lower side, the substrate is sent downstream by the seventh belt conveyor, and the component separated from the substrate falls from between the belt conveyors on the lower side, thereby allowing smooth recovery of each of the substrate and the component. Further, since the lower surface processing transporter 101 has the adjustment roller 18 and the auxiliary rods 19, even if an upward impact force is generated during the separation of the component by the lower surface rotary blade 8, for example due to a large component attached to the substrate, the two fixed auxiliary rods 19 receive the force, thereby allowing smooth processing and preventing damage to the first belt conveyor 1. It should be noted that in the upper surface processing device 200, since the lower surface of the substrate has already been processed, the overall thickness of the substrate is thin and the impact is small, so there is no problem without the auxiliary rods 19. Furthermore, between the outlet of the first belt conveyor 1 and third belt conveyor 3 (the outlet of the lower surface processing device 100) and the inlet of the fourth belt conveyor 4 and sixth belt conveyor 6 (the outlet of the upper surface processing device 200) and between the outlet of the fourth belt conveyor 4 and sixth belt conveyor 6 and the inlet of the fifth belt conveyor 5 and seventh belt conveyor 7, there is a difference in the height at which the substrate is transported. Thus, when the substrate passes through these areas, the transport speed is reduced, and the component is more reliably separated by the upper surface rotary blade 9. Especially in the latter area, since the downstream side of the upper surface rotary blade 9 is higher than the upstream side of the upper surface rotary blade 9, the substrate passing through the area is inclined in an orientation with the rear lifted, and thus the upper surface rotary blade 9 reliably comes into contact with the upper surface of the substrate to separate the component. Further, the downstream end of the sixth belt conveyor 6 extends to the lower side of the upper surface rotary blade 9 and the upper surface of the sixth belt conveyor 6 is inclined upward toward the downstream side. Thus, during the separation of the component by the upper surface rotary blade 9, the substrate is held by the sixth belt conveyor 6 and is transported so as to approach the upper surface rotary blade 9 by the inclination of the sixth belt conveyor 6, and therefore the component is more reliably separated by the upper surface rotary blade 9.

Figure 6:
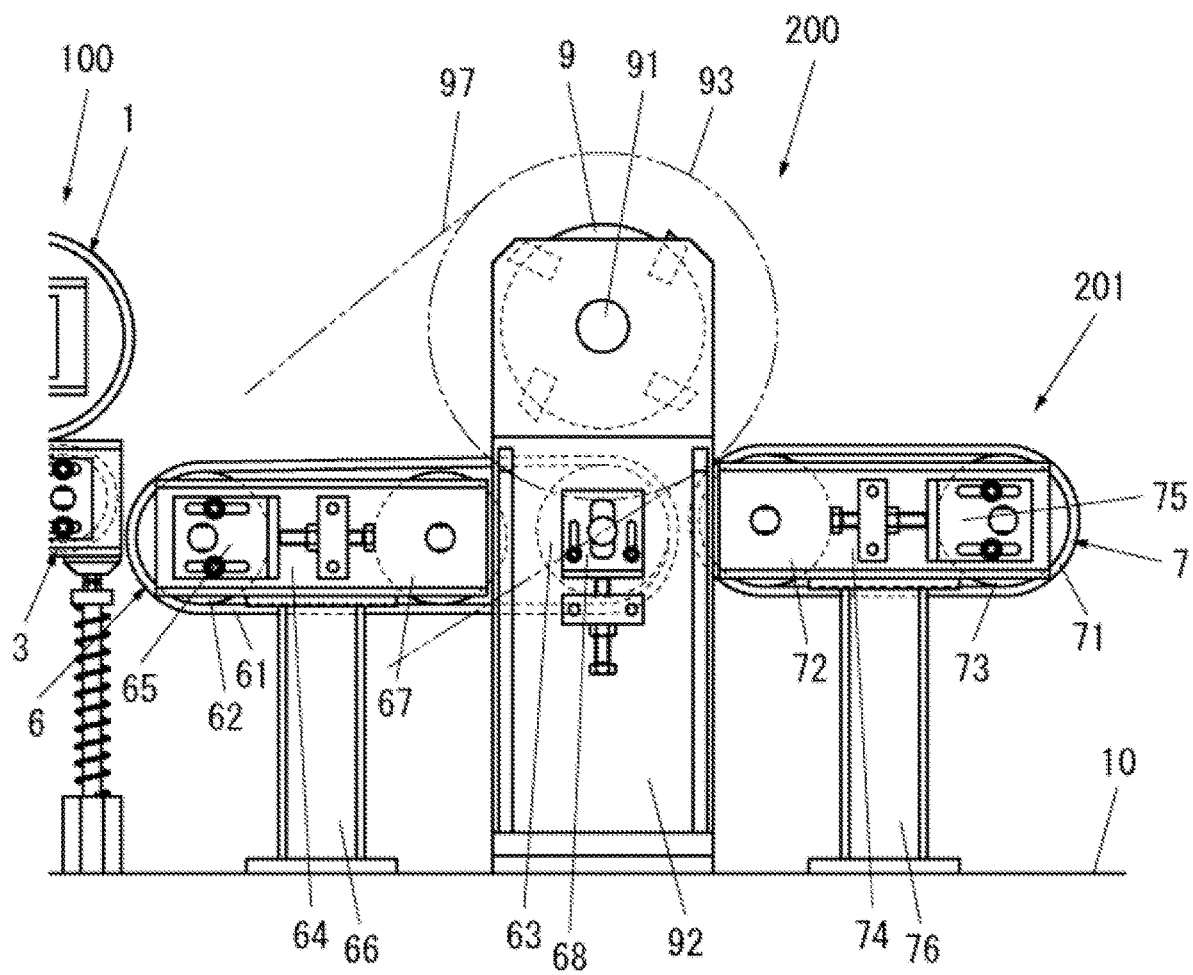
FIG. 6 is an enlarged view of the upper surface processing device of a substrate processing apparatus according to a second embodiment.

Next, a substrate processing apparatus according to a second embodiment of the present invention will be described. The second embodiment is different from the first embodiment in the configuration of the upper surface processing transporter 201 of the upper surface processing device 200, and only this portion will be described below. As shown in FIG. 6, the upper surface processing transporter 201 of the second embodiment is composed of the sixth belt conveyor 6 and the seventh belt conveyor 7 below the upper surface rotary blade 9. The sixth belt conveyor 6 and the seventh belt conveyor 7 are the same as those of the first embodiment, and the sixth belt conveyor 6 and the seventh belt conveyor 7 are aligned in the front-rear direction (the direction in which the substrate is transported), and the rear portion of the upper surface rotary blade 9 faces the gap between the sixth belt conveyor 6 and the seventh belt conveyor 7. That is, the upper surface processing transporter 201 of the second embodiment is obtained by eliminating the fourth belt conveyor 4 and the fifth belt conveyor 5 from the upper surface processing transporter 201 of the first embodiment.

In the substrate processing apparatus according to the second embodiment of the present invention configured in this manner, while the component is peeled off from the substrate in the upper surface processing device 200, the substrate is held by the sixth belt conveyor 6 and then sent further downstream to be held by the seventh belt conveyor 7. Thus, the substrate maintains a horizontal orientation and the component is reliably separated. In addition, since the rear portion of the upper surface rotary blade 9 faces the gap between the two belt conveyors (the sixth belt conveyor 6 and the seventh belt conveyor 7) on the lower side, the substrate is sent downstream by the seventh belt conveyor 7, and the component separated from the substrate falls from between the belt conveyors on the lower side, thereby allowing smooth recovery of each of the substrate and the component. For the rest, the lower surface processing device 100 and the provision of the lower surface processing device 100 and upper surface processing device 200 are the same as those of the first embodiment, and the same operational effects are obtained.

Figure 7:
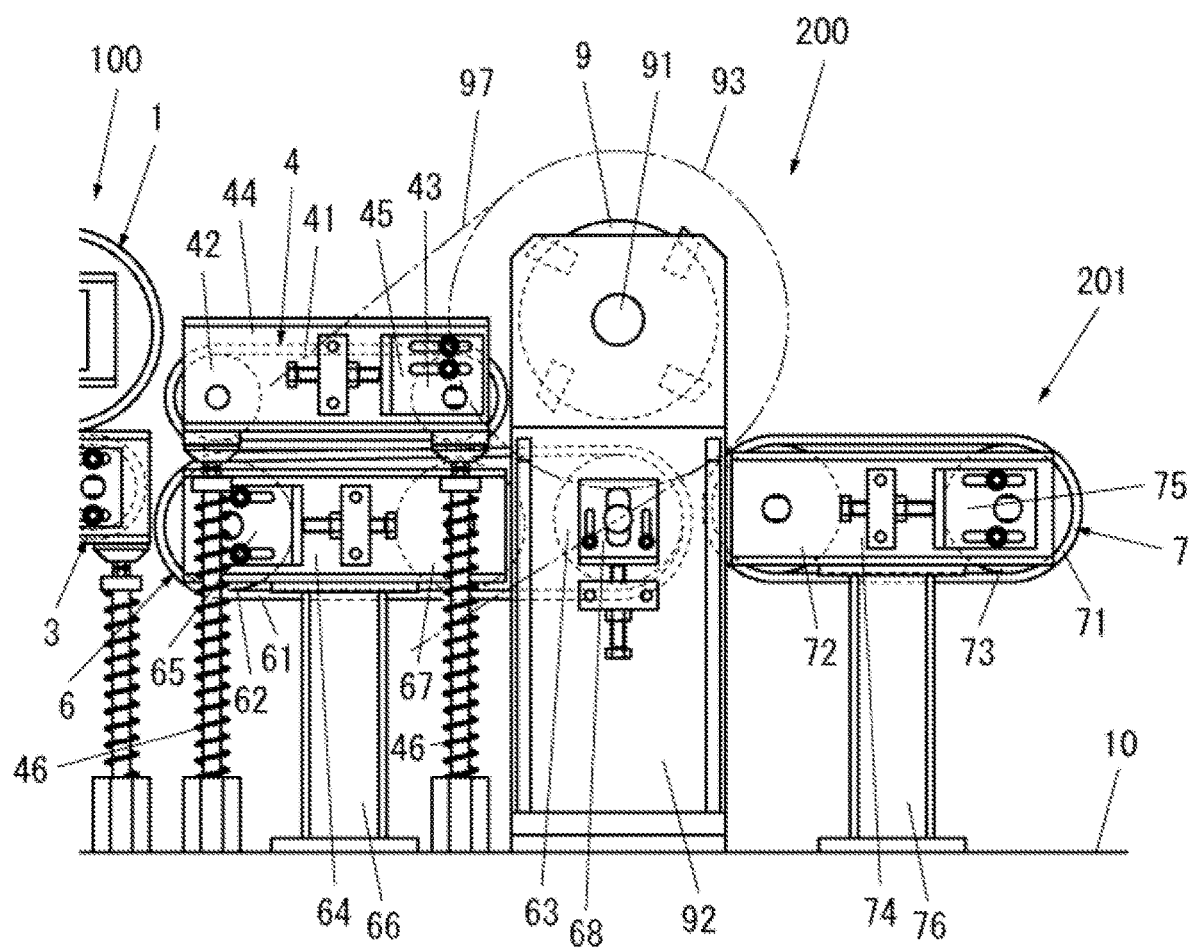
FIG. 7 is an enlarged view of the upper surface processing device of a substrate processing apparatus according to a third embodiment.

Next, a substrate processing apparatus according to a third embodiment of the present invention will be described. The third embodiment is different from the first embodiment in the configuration of the upper surface processing transporter 201 of the upper surface processing device 200, and only this portion will be described below. As shown in FIG. 7, the upper surface processing transporter 201 of the third embodiment is composed of a fourth belt conveyor 4 upstream of the upper surface rotary blade 9, and a sixth belt conveyor 6 and seventh belt conveyor 7 below the upper surface rotary blade 9. The fourth belt conveyor 4, the sixth belt conveyor 6, and the seventh belt conveyor 7 are the same as those of the first embodiment, the sixth belt conveyor 6 and the seventh belt conveyor 7 are aligned in the front-rear direction (direction in which the substrate is transported), the sixth belt conveyor 6 is located below the fourth belt conveyor 4, and the rear portion of the upper surface rotary blade 9 faces the gap between the sixth belt conveyor 6 and the seventh belt conveyor 7. That is, the upper surface processing transporter 201 of the third embodiment is obtained by eliminating the fifth belt conveyor 5 from the upper surface processing transporter 201 of the first embodiment.

In the substrate processing apparatus according to the third embodiment of the present invention configured in this manner, while the component is peeled off from the substrate in the upper surface processing device 200, the substrate is held by the sixth belt conveyor 6 and then sent further downstream to be held by the seventh belt conveyor 7. Thus, the substrate maintains a horizontal orientation and the component is reliably separated. Further, the substrate is sandwiched between the upper and lower belt conveyors upstream of the upper surface rotary blade 9. Thus, the substrate enters the upper surface rotary blade 9 while being firmly held in the horizontal orientation, and therefore the component is more reliably separated. In addition, since the rear portion of the upper surface rotary blade 9 faces the gap between the two belt conveyors (the sixth belt conveyor 6 and the seventh belt conveyor 7) on the lower side, the substrate is sent downstream by the seventh belt conveyor 7, and the component separated from the substrate falls from between the belt conveyors on the lower side, thereby allowing smooth recovery of each of the substrate and the component. For the rest, the lower surface processing device 100 and the provision of the lower surface processing device 100 and upper surface processing device 200 are the same as those of the first embodiment, and the same operational effects are obtained.

Figure 8:
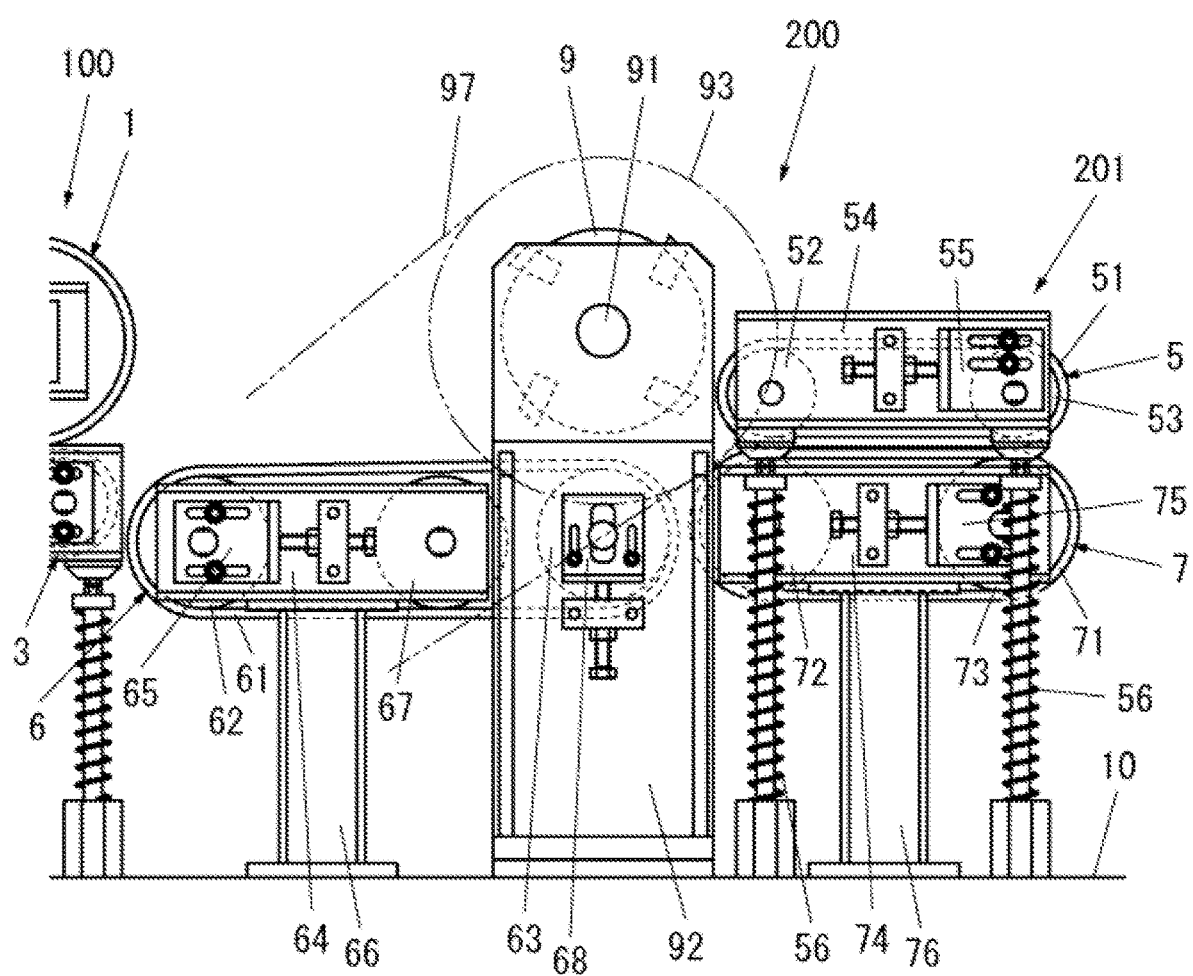
FIG. 8 is an enlarged view of the upper surface processing device of a substrate processing apparatus according to a fourth embodiment.

Next, a substrate processing apparatus according to a fourth embodiment of the present invention will be described. The fourth embodiment is different from the first embodiment in the configuration of the upper surface processing transporter 201 of the upper surface processing device 200, and only this portion will be described below. As shown in FIG. 8, the upper surface processing transporter 201 of the fourth embodiment is composed of a fifth belt conveyor 5 downstream of the upper surface rotary blade 9, and a sixth belt conveyor 6 and seventh belt conveyor 7 below the upper surface rotary blade 9. The fifth belt conveyor 5, the sixth belt conveyor 6, and the seventh belt conveyor 7 are the same as those of the first embodiment, the sixth belt conveyor 6 and the seventh belt conveyor 7 are aligned in the front-rear direction (direction in which the substrate is transported), the seventh belt conveyor 7 is located below the fifth belt conveyor 5, and the rear portion of the upper surface rotary blade 9 faces the gap between the sixth belt conveyor 6 and the seventh belt conveyor 7. That is, the upper surface processing transporter 201 of the fourth embodiment is obtained by eliminating the fourth belt conveyor 4 from the upper surface processing transporter 201 of the first embodiment.

In the substrate processing apparatus according to the fourth embodiment of the present invention configured in this manner, while the component is peeled off from the substrate in the upper surface processing device 200, the substrate is held by the sixth belt conveyor 6 and then sent further downstream to be held by the seventh belt conveyor 7. Thus, the substrate maintains a horizontal orientation and the component is reliably separated. Further, the substrate is sandwiched between the upper and lower belt conveyors downstream of the upper surface rotary blade 9. Thus, the substrate having passed through the upper surface rotary blade 9 is firmly held in the horizontal orientation, and therefore the component is more reliably separated. In addition, since the rear portion of the upper surface rotary blade 9 faces the gap between the two belt conveyors (the sixth belt conveyor 6 and the seventh belt conveyor 7) on the lower side, the substrate is sent downstream by the seventh belt conveyor 7, and the component separated from the substrate falls from between the belt conveyors on the lower side, thereby allowing smooth recovery of each of the substrate and the component. For the rest, the lower surface processing device 100 and the provision of the lower surface processing device 100 and upper surface processing device 200 are the same as those of the first embodiment, and the same operational effects are obtained.

Next, a substrate processing apparatus according to a fifth embodiment of the present invention will be described. The fifth embodiment is different from the first embodiment in the configuration of the lower surface processing transporter 101 of the lower surface processing device 100, and only this portion will be described below. As shown in FIG. 9, the lower surface processing transporter 101 of the fifth embodiment is composed of a first belt conveyor 1 above the lower surface rotary blade 8 and a second belt conveyor 2 upstream of the lower surface rotary blade 8. The first belt conveyor 1 extends from the upstream side of the lower surface rotary blade 8 to immediately above the lower surface rotary blade 8, and has the endless belt 11 extending in the front-rear direction, and the end rollers 12 and 13 provided at front and rear ends inside the endless belt 11. However, similarly to the adjustment roller 18 of the first embodiment, the rear end roller 13 has left and right ends supported by the bearings 181, and the bearings 181 are vertically movable with respect to the beam members 14. Furthermore, the left and right ends of the front end roller 12 are rotatably supported by the plate-shaped bearings 15 attached to the beam members 14, and the bearings 15 are movable in the front-rear direction with respect to the beam members 14. Further, as in the first embodiment, the pressing roller 17 is provided at a position above the rear end roller 23 of the second belt conveyor 2, inside the endless belt 11 of the first belt conveyor 1. The second belt conveyor 2 is the same as that of the first embodiment, and the second belt conveyor 2 is located below the front portion of the first belt conveyor 1. That is, the lower surface processing transporter 101 of the fifth embodiment is obtained by eliminating the third belt conveyor 3 from the lower surface processing transporter 101 of the first embodiment and shortening the first belt conveyor 1. In addition, the fourth belt conveyor 4 of the upper surface processing device 200 is located downstream of the first belt conveyor 1 of the lower surface processing device 100, and the sixth belt conveyor 6 of the upper surface processing device 200 is located downstream of the lower surface rotary blade 8 of the lower surface processing device 100.

In the substrate processing apparatus according to the fifth embodiment of the present invention configured in this manner, since the lower surface rotary blade 8 of the lower surface processing device 100 is located between the two belt conveyors (the second belt conveyor 2, and the sixth belt conveyor 6 of the upper surface processing device 200) on the lower side, the component separated by the lower surface processing device 100 fall from between the belt conveyors on the lower side and the lower surface rotary blade 8, and thus can be smoothly recovered. For the rest, the upper surface processing device 200 and the provision of the lower surface processing device 100 and the upper surface processing device 200 are the same as those of the first embodiment, and the same operational effects are obtained.

The present invention is not limited to the above embodiments. For example, the upper surface processing device may be located upstream of the lower surface processing device, or the present invention may have only the upper surface processing device without the lower surface processing device. Furthermore, any structure may be used for supporting each belt conveyor and each rotary blade. Further, the structure of the rotary blade is also shown as an example, and any structure may be used. Furthermore, the substrate transport height between the upper and lower belt conveyors on the upstream side and the downstream side may be stepped in a different manner from above, or may not be stepped. It should be noted that the apparatus according to the above-described embodiments is intended for a personal computer substrate, but for example, in cases where the apparatus is intended for a smaller mobile phone substrate, the overall size of the apparatus may be reduced while the above configuration is maintained by, for example, reducing the number of rotors of the rotary blade or shortening the width and length of each of the belt conveyors.

REFERENCE SIGNS LIST 1 first belt conveyor
2 second belt conveyor
3 third belt conveyor
4 fourth belt conveyor
5 fifth belt conveyor
6 sixth belt conveyor
7 seventh belt conveyor
8 lower surface rotary blade
9 upper surface rotary blade
18 adjustment roller
19 auxiliary rod
100 lower surface processing device
101 lower surface processing transporter
200 upper surface processing device
201 upper surface processing transporter

The invention claimed is:
1. A substrate processing apparatus for separating an electronic component from a substrate with the electronic component attached to an upper surface of the substrate, the substrate processing apparatus comprising:
   an upper surface processing device configured to separate the electronic component from the upper surface of the substrate, wherein
   the upper surface processing device comprises an upper surface processing transporter configured to transport the substrate from an upstream side to a downstream side and an upper surface rotary blade configured to separate the electronic component from the upper surface of the substrate, the upper surface processing transporter comprises a sixth belt conveyor on the upstream side and a seventh belt conveyor on the downstream side, the sixth and seventh belt conveyors being located below the upper surface rotary blade and aligned in a transport direction, the upper surface rotary blade has a downstream portion facing a gap between the sixth belt conveyor and the seventh belt conveyor, and the sixth belt conveyor has a downstream end extending to the lower side of the upper surface rotary blade in the transport direction.

2. The substrate processing apparatus according to claim 1, wherein the upper surface processing transporter comprises a fourth belt conveyor located above the sixth belt conveyor and is configured to transport the substrate while sandwiching the substrate between the fourth belt conveyor on an upper side and the sixth belt conveyor on a lower side, and the upper surface rotary blade is located downstream of the fourth belt conveyor.

3. The substrate processing apparatus according to claim 1, wherein the upper surface processing transporter comprises a fifth belt conveyor located above the seventh belt conveyor and is configured to transport the substrate while sandwiching the substrate between the fifth belt conveyor on an upper side and the seventh belt conveyor on a lower side, and the upper surface rotary blade is located upstream of the fifth belt conveyor.

4. The substrate processing apparatus according to claim 1, wherein the upper surface processing transporter comprises a fourth belt conveyor on the upstream side and a fifth belt conveyor on the downstream side, the fourth and fifth belt conveyors being respectively located above the sixth belt conveyor and the seventh belt conveyor and aligned in the transport direction, the upper surface processing transporter is configured to transport the substrate while sandwiching the substrate between the fourth belt conveyor on an upper side and the sixth belt conveyor on a lower side and between the fifth belt conveyor on the upper side and the seventh belt conveyor on the lower side, and the upper surface rotary blade is located between the fourth belt conveyor and the fifth belt conveyor.

5. The substrate processing apparatus according to claim 1, for separating the electronic component from both upper and lower surfaces of the substrate with the electronic component attached to the upper and lower surfaces, the substrate processing apparatus comprising:

a lower surface processing device configured to separate the electronic component from the lower surface of the substrate; and the upper surface processing device, wherein one of the lower surface processing device and the upper surface processing device is located on the upstream side in a direction in which the substrate is transported and the other processing device is located on the downstream side in the direction in which the substrate is transported, and the lower surface processing device comprises a lower surface processing transporter configured to transport the substrate from the upstream side to the downstream side and a lower surface rotary blade configured to separate the electronic component from the lower surface of the substrate.

6. The substrate processing apparatus according to claim 5, wherein the upper surface processing device is located downstream of the lower surface processing device, the lower surface processing transporter has a first belt conveyor located on an upper side, and a second belt conveyor on the upstream side and a third belt conveyor on the downstream side, the second and third belt conveyors being located on a lower side and aligned in the transport direction, the lower surface processing transporter is configured to transport the substrate while sandwiching the substrate between the first belt conveyor on the upper side and the second belt conveyor and third belt conveyor on the lower side, and the lower surface rotary blade is located between the second belt conveyor and the third belt conveyor.

7. The substrate processing apparatus according to claim 6, wherein the lower surface processing transporter has an adjustment roller and two auxiliary rods located inside the first belt conveyor, the adjustment roller is located above the lower surface rotary blade and capable of vertical positional adjustment with respect to the lower surface rotary blade, and the auxiliary rods are located upstream and downstream of the adjustment roller and have fixed vertical positions with respect to the lower surface rotary blade.

8. The substrate processing apparatus according to claim 6, wherein a transport height at which the substrate is transported at an outlet of the lower surface processing device is different from a transport height at which the substrate is transported at an inlet of the upper surface processing device.

9. The substrate processing apparatus according to claim 4, wherein a transport height at which the substrate is transported at an outlet of the fourth belt conveyor and sixth belt conveyor is different from a transport height at which the substrate is transported at an inlet of the fifth belt conveyor and seventh belt conveyor.

10. The substrate processing apparatus according to claim 9, wherein the transport height of the substrate at the inlet of the fifth belt conveyor and seventh belt conveyor is higher than the transport height of the substrate at the outlet of the fourth belt conveyor and sixth belt conveyor.

11. The substrate processing apparatus according to claim 1, wherein the sixth belt conveyor has a downstream end which extends to a lower side of the upper surface rotary blade and an upper surface inclined upward toward the downstream side.

* * * * *